Sept. 24, 1963 N. HILL 3,104,890
UTILITY CART HAVING TELESCOPING TUBULAR FRAME MEMBERS
Filed Oct. 24, 1961 3 Sheets-Sheet 1

Neil Hill
INVENTOR.

BY *Clarence A. O'Brien*
*and Harvey B. Jackson*
Attorneys

Sept. 24, 1963 N. HILL 3,104,890
UTILITY CART HAVING TELESCOPING TUBULAR FRAME MEMBERS
Filed Oct. 24, 1961 3 Sheets-Sheet 2
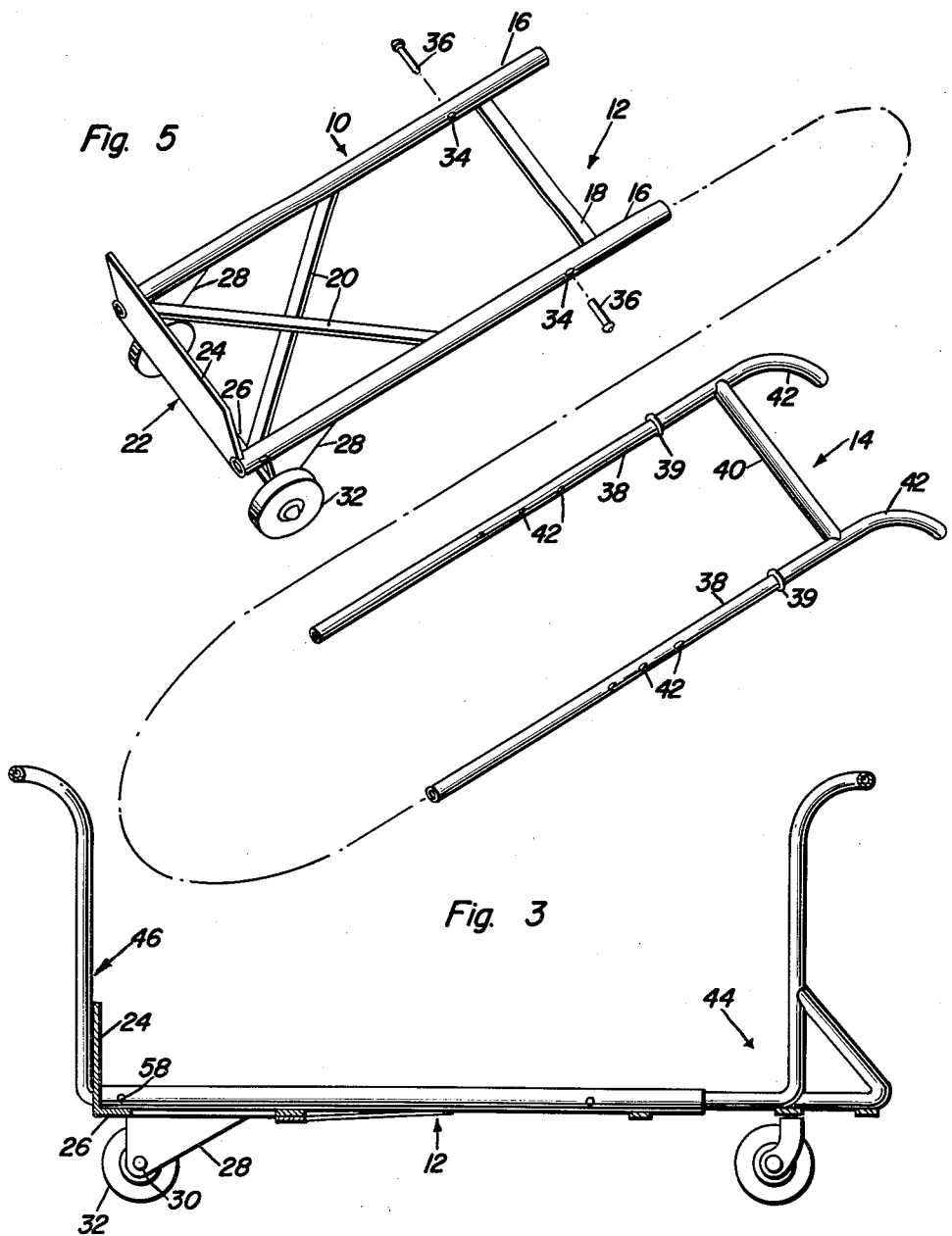
Neil Hill
INVENTOR.
BY *Clarence A. O'Brien*
*and Harvey B. Jackson*
Attorneys Sept. 24, 1963 N. HILL 3,104,890
UTILITY CART HAVING TELESCOPING TUBULAR FRAME MEMBERS
Filed Oct. 24, 1961 3 Sheets-Sheet 3
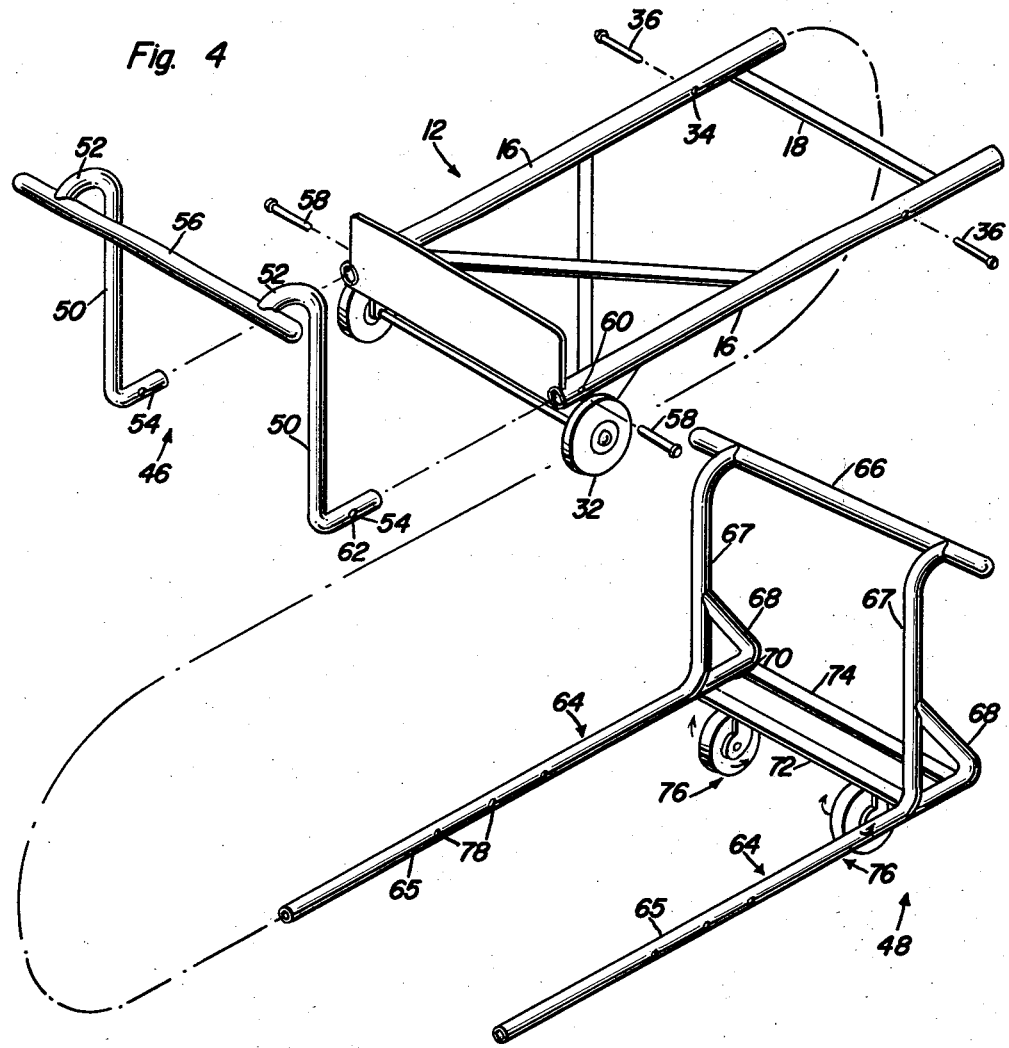
Neil Hill
INVENTOR.

United States Patent Office 3,104,890
Patented Sept. 24, 1963

3,104,890
UTILITY CART HAVING TELESCOPING
TUBULAR FRAME MEMBERS
Neil Hill, Box 844, Chappell, Nebr.
Filed Oct. 24, 1961, Ser. No. 147,224
7 Claims. (Cl. 280—34)

This invention relates to load carrying devices, and more particularly to manually propelled load carrying vehicles.

Briefly, the invention comprises a two wheeled hand truck having a hollow tubular frame which receives removable handles. Consequently the device may be used as a hand truck, or if desired, the handles may be removed and a more complex handle having two wheels mounted thereon may be substituted for the hand truck handle. This substitution converts the device into a four wheeled wagon or push cart with its load carrying body in a generally horizontal position.

Consequently, it is the primary object of this invention to provide a two wheeled hand truck which can almost instantaneously be converted into a four wheeled manually operated wagon or cart.

It is still another object of the invention to provide a hand truck that can be converted into a wagon or cart which has upstanding end walls thereon for increasing the load carrying capacity of the wagon or cart, and either of which end portions may be used as a handle for pushing the wagon or cart.

It is still another object of the invention to provide a hand truck which has a device that may be rapidly attached to the lower end thereof for increasing the carrying capacity of the truck.

It is another object of the invention to provide a device which may be quickly and easily converted from a hand truck to a wagon or vice versa without requiring any special tools or any special skill on the part of the operator.

It is still another object of the invention to provide a hand truck convertible into a wagon or cart which is composed of standard materials, is simple in design and therefore easy and economical to manufacture.

It is another object of the invention to provide a convertible hand truck and wagon or cart which is of lightweight construction, yet it is unusually durable, and therefore requires a minimum of maintenance.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a cros ssectional elevational view taken substantially on the plane of line 3—3 in FIGURE 1;

FIGURE 4 is an exploded perspective view of the device shown in FIGURE 1; and

FIGURE 5 is an exploded perspective view of the device shown in FIGURE 2.

Figure 2:
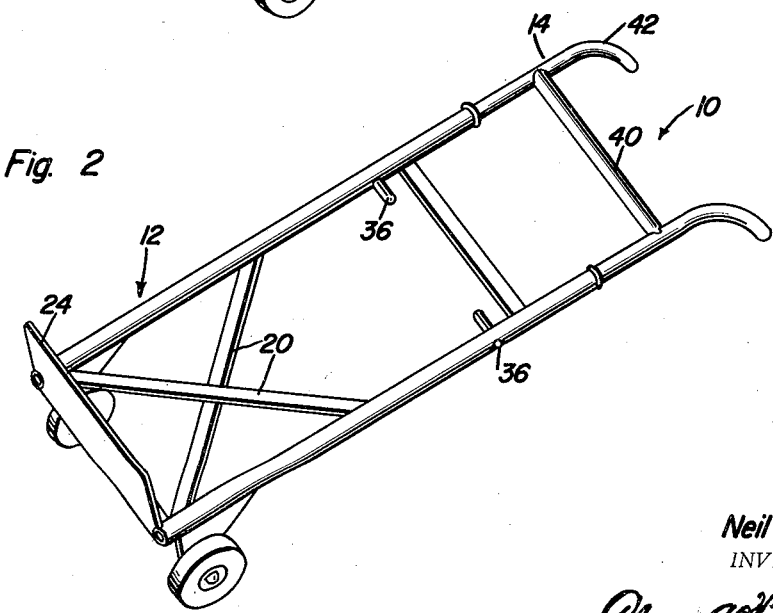
FIGURE 2 is a perspective view of the invention when assembled as a hand truck.

With continuing reference to the drawings, and particularly to FIGURES 2 and 5, it can be seen that the hand truck 10 shown in these views is composed primarily of a body assembly 12 and a handle assembly 14.

The body assembly 12 comprises two tubular side rails 16 rigidly connected together by an upper cross-brace 18 and two lower diagonal cross-braces 20 welded to the side rails. A support base 22 comprising a nose or base plate 24 having an integral flange 26 bent therefrom and at right angles thereto is connected between the extreme lower ends of the rails 16 so that the connecting portions between the plate 24 and flange 26 lie between the side rails and the plane of the base plate 24 is perpendicular to the rails. As shown, the end portions of the plate 24 are provided with recesses which receive the side rails 16.

Two identical triangular wheel supports 28 are integrally secured as by welding to the lower ends and back sides of the rails 16. The extreme lower ends of the triangular supports 28 have circular apertures therein which receive an axle shaft 30 that is circular in cross-section and has a wheel 32 of conventional construction rotatably journalled on each end thereof.

The upper portions of the rails 16 each have a circular bore 34 extending therethrough which is aligned with the bore 34 in the opposite rails. These bores 34 snugly and slidably receive headed pins 36.

The handle assembly 14 comprises two elongated handle tubes 38 which are rigidly connected together in parallel relationship by cross handle 40. The upper ends of the tubes 38 are formed into arcuate handles 42. The diameters of the tubes 38 and the spacing thereof as determined by the cross handle 40 is such that the tubes may easily slide with a relatively snug fit within the tubular rails 16. After the handle tubes 38 are inserted in the rails 16, the relative position of the handles 42 in relation to the base plate 24 may be determined by properly aligning the apertures 34 with a preselected bore 42, and then inserting the pins 36 through these aligned bores for securing the handle assembly 14 to the body assembly 12.

Figure 1:
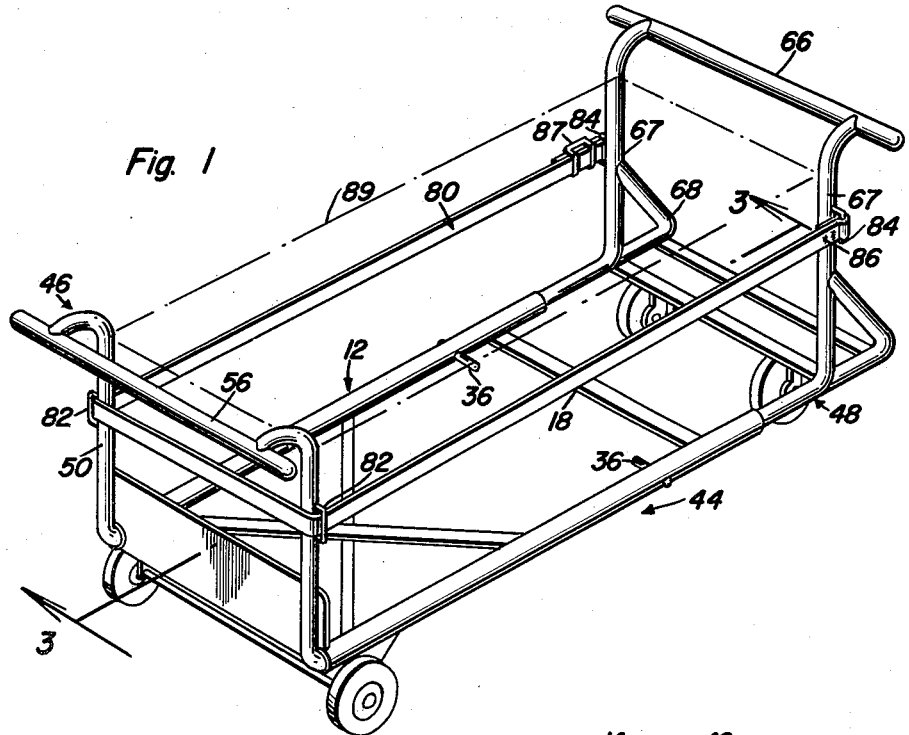
FIGURE 1 is a perspective view of the invention when assembled as a wagon or cart.

As shown in FIGURES 1, 3 and 4, the push cart or wagon 44 comprises the body assembly 12 used with the hand truck 10, a base extension 46, and the wheel support assembly 48.

The base extension unit 46 comprises two elongated tubular upright members 50 having upper and lower ends 52 and 54 bent at right angles thereto and in opposite directions as shown in FIGURE 4. The tubular members are connected in parallel relationship by handle bar 56 extending substantially perpendicular to the ends 52 and rigidly connected thereto. The lower ends 54 are parallel and so spaced that they are slidably received in the lower ends of the rails 16 and are retained therein by pins 58 which snugly fit through aligned aperture 60 in the lower ends of the rails 16 and aptrtures or bores 62 in the ends 54.

The wheel support assembly or handle unit 48 comprises two L-shaped body members 64 connected in parallel relationship by handle bar 66. The connections between the legs of each L-shaped member 64 are reinforced by two tubular, rearwardly extending members bent into a V-shape as shown at 68 and rigidly secured to the L-shaped members. The lower legs 70 of the V-shaped members 68 are horizontal, parallel and rigidly connected together by two parallel braces 72 and 74. The brace 72 has connected on opposite ends thereof two caster wheel assemblies 76 of conventional construction and arranged so that the wheels thereof are normally parallel to each other and perpendicular to the axle 30 for the wheels 32. Each of the lower legs 65 of the L-shaped member 64 contains a plurality of bores which are aligned with bores in the opposite leg 65. The legs 65 extend into the upper ends of the rails 16 and are secured thereto by means of the pins 36 extending through the aligned bores 34 and 78.

From the above description, it is readily apparent that the body assembly 12 may be used alternatively as the main portion of a hand truck or a push cart as desired. To use the body assembly as a hand cart, it is only necessary to insert the handle assembly 14 into the side rails 16 until the circular flanges 39 on the handle tubes 38 strike the upper ends of the rail 16 so as to align the upper bores 42 with the bores 34 whereupon the handle and body may be connected together by the pins 36. The handle may be adjusted to a higher elevation by removing the pins and aligning one of the lower bores 42 with the bores 34 and reinserting the pins. For carrying larger loads, the base of the hand truck may be enlarged by inserting the base extension 46 in the lower ends of the rails 16 and locking them in place by means of the pins 58.

If it is desired to convert the hand truck into a push cart, it is only necessary to remove the handle assembly 14 and replace it with the wheel support assembly 48 in an obvious manner. The length of the body of the push cart or wagon 44 is determined by which of the bores 78 is aligned with the bores 34 before insertion of the pins 36.

While the pins 36 are satisfactory for positively connecting the base extension 46 to the wheel support assembly 48 or the hand assembly 14, it is preferable to connect these elements by a flexible webbing or belt 80 as illustrated in FIGURE 1. For retaining the belt 80 in proper position, two U-shaped guide members 82 are welded to the upper portions of the tubular members 50, and two similar U-shaped guide members 84 are welded to the upper end portions of the tubular members 67. One end of the belt 80 is looped through one of the U-shaped members 84, folded back upon itself and the overlapping portions of the belt are sewed or snapped together as shown at 86. The belt is then threaded through the members 82, a buckle 87 of conventional design is then placed over the end 88 of the belt 80 and the end 88 is then threaded through the other U-shaped member 84 and folded back upon itself and guided through the buckle 87. The numeral 89 in FIGURE 1 represents a typical load mounted on the wagon 44 and between the tubular upright members 50 and 67. After the end 88 of the belt is guided through the buckle 87, the buckle is adjusted so as to tighten the belt to draw the upright tubular members 50 and 67 tightly against the load 89. By using the belt 80, the load 89 may be snugly secured between the ends of the wagon 44 and the tubular members 50 and 67 may be spread further apart than when using the pins 36 to maintain them together.

A webbing similar to the webbing 80 in FIGURE 1 may also be used to secure the body assembly 12 and handle assembly 14 of the hand truck shown in FIGURE 2. This is done after a load is placed on the base plate 24. After a load is placed on the base plate 24, the webbing or belt may be looped around the central portion of the base plate, both ends of the webbing extended forwardly over the load and vertically upward and the ends may be then strapped around the handle member 40. By tightening the webbing after it is installed in this manner, the member 40 is drawn tightly downwardly towards the base plate 24 thereby rigidly holding the load, the body assembly 12 and handle assembly 14 securely and snugly together.

Of course, when the webbing is used for securing the load and parts of the wagon or hand truck together, the pins 36 are omitted. The advantages of the webbing over the pins is that it permits the telescoping parts of the wagon or hand truck to be further extended apart for carrying a bigger load and the webbing serves a dual function of maintaining the parts of the wagon or truck together while at the same time securely holding the load on the hand truck or wagon.

In general, the parts of the invention will be assembled as a hand cart for carrying relatively light loads, while for carrying heavier loads, the device will be converted to a push cart as shown at 44 in FIGURE 1. The upright legs 50 and 67 of the push cart will permit the stacking of relatively large and bulky loads thereon. As shown, the handles 56 and 66 extend laterally beyond the upper end portions of the respective pairs of uprights 50 and 67.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use as a hand truck and push cart, a load carrying device comprising a load-supporting frame including a pair of spaced, parallel tubular side rails, connecting braces extending between said rails, supporting wheels mounted beneath one end portion of the rails, an upstanding nose plate on said one end portion of said rails, a removable extension unit on said one end portion of the rails, a removable handle unit longitudinally slidably adjustably mounted on the other end portions of the rails, said units including pairs of spaced, tubular uprights for receiving a load on the frame therebetween, said uprights including spaced, parallel, inwardly extending lower portions slidably engaged in the rails and further including outwardly curved upper end portions, handle bars extending between and beyond said upper end portions of the uprights, and common means for retaining the load on the frame and drawing the units toward each other for clampingly engaging said load.

2. For use as a hand truck and push cart, a load carrying device comprising a load-supporting frame including a pair of spaced, parallel tubular side rails, connecting braces extending between said rails, supporting wheels mounted beneath one end portion of the rails, an upstanding nose plate on said one end portion of said rails, a removable extension unit on said one end portion of the rails, a removable handle unit longitudinally slidably adjustably mounted on the other end portions of the rails, said units including pairs of spaced, tubular uprights for receiving a load on the frame therebetween, said uprights including spaced, parallel, inwardly extending lower portions slidably engaged in the rails and further including outwardly curved upper end portions, handle bars extending between and beyond said upper end portions of the uprights, and common means for retaining the load on the frame and drawing the units toward each other for clampingly engaging said load, said common means including guide loops on the uprights of the extension unit uprights, a strap slidable through the guides and having one end anchored to one of the handle unit uprights, and means including a buckle for adjustably connecting the other end of the strap to the other handle unit upright.

3. A load carrying device in accordance with claim 2, said side rails receiving the nose plate therebetween for leaving said one end portion of the rails open for receiving said lower portions of the extension unit uprights, said nose plate being transversely elongated and having recesses in its end portions receiving the rails, said nose plate comprising an angularly bent flange on its lower portion secured beneath the rails.

4. A load carrying device in accordance with claim 2, said handle unit further including generally V-shaped, rearwardly extending braces affixed to the lower portions of the handle unit uprights.

5. A load carrying device in accordance with claim 4, said handle unit still further including spaced, parallel transverse braces extending between the lower legs of the V-shaped braces.

6. The combination of claim 5, said lower legs of said V-shaped braces being longitudinally aligned with said lower portions of the handle unit uprights, the upper legs of said V-shaped braces being rearwardly and downwardly inclined.

7. The combination of claim 6, said handle unit still further including a pair of supporting caster wheels mounted beneath one of the third-named braces.

References Cited in the file of this patent

UNITED STATES PATENTS

| | | |
|---|---|---|
| 363,940 | Ash | May 31, 1887 |
| 2,219,609 | Askeris | Oct. 29, 1940 |
| 2,396,953 | Kirchdorfer | Mar. 19, 1946 |
| 2,427,803 | Mueller | Sept. 23, 1947 |
| 2,519,113 | Cohn | Aug. 15, 1950 |
| 2,820,643 | Cohn | Jan. 21, 1958 |
| 2,899,213 | Winger | Aug. 11, 1959 |